INVENTOR
ZBYSLAW M. CIOLKOSZ

BY *Leech and Radue*

ATTORNEYS

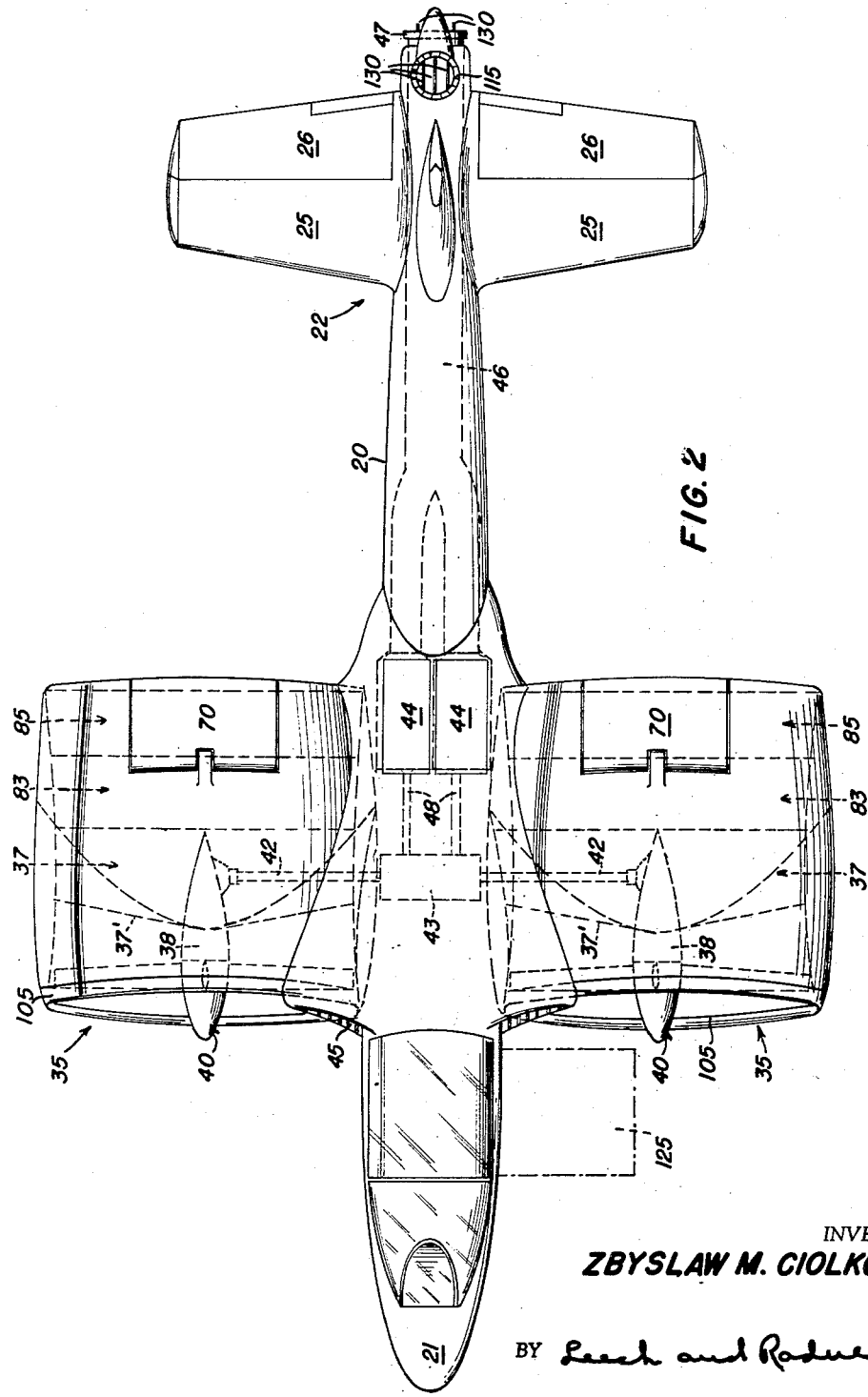

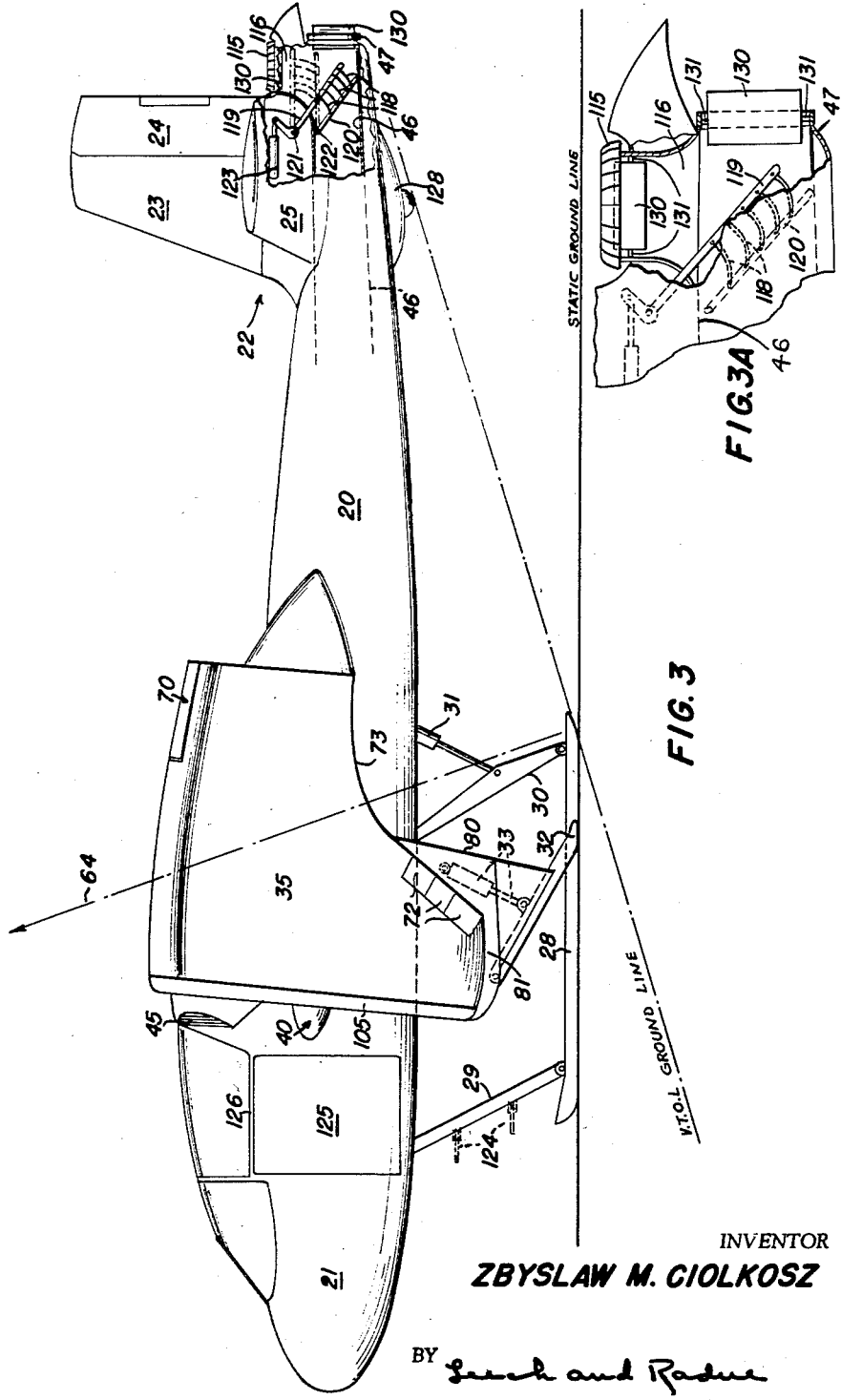

INVENTOR
ZBYSLAW M. CIOLKOSZ

BY *Leech and Roche*

ATTORNEYS

March 22, 1960     Z. M. CIOLKOSZ     2,929,580
AIRCRAFT FOR VERTICAL OR SHORT TAKEOFF, AND INTEGRATED
PROPULSION LIFTING AND PROPELLER SLIP
STREAM DEFLECTING UNIT THEREFOR
Filed June 18, 1956     6 Sheets-Sheet 6
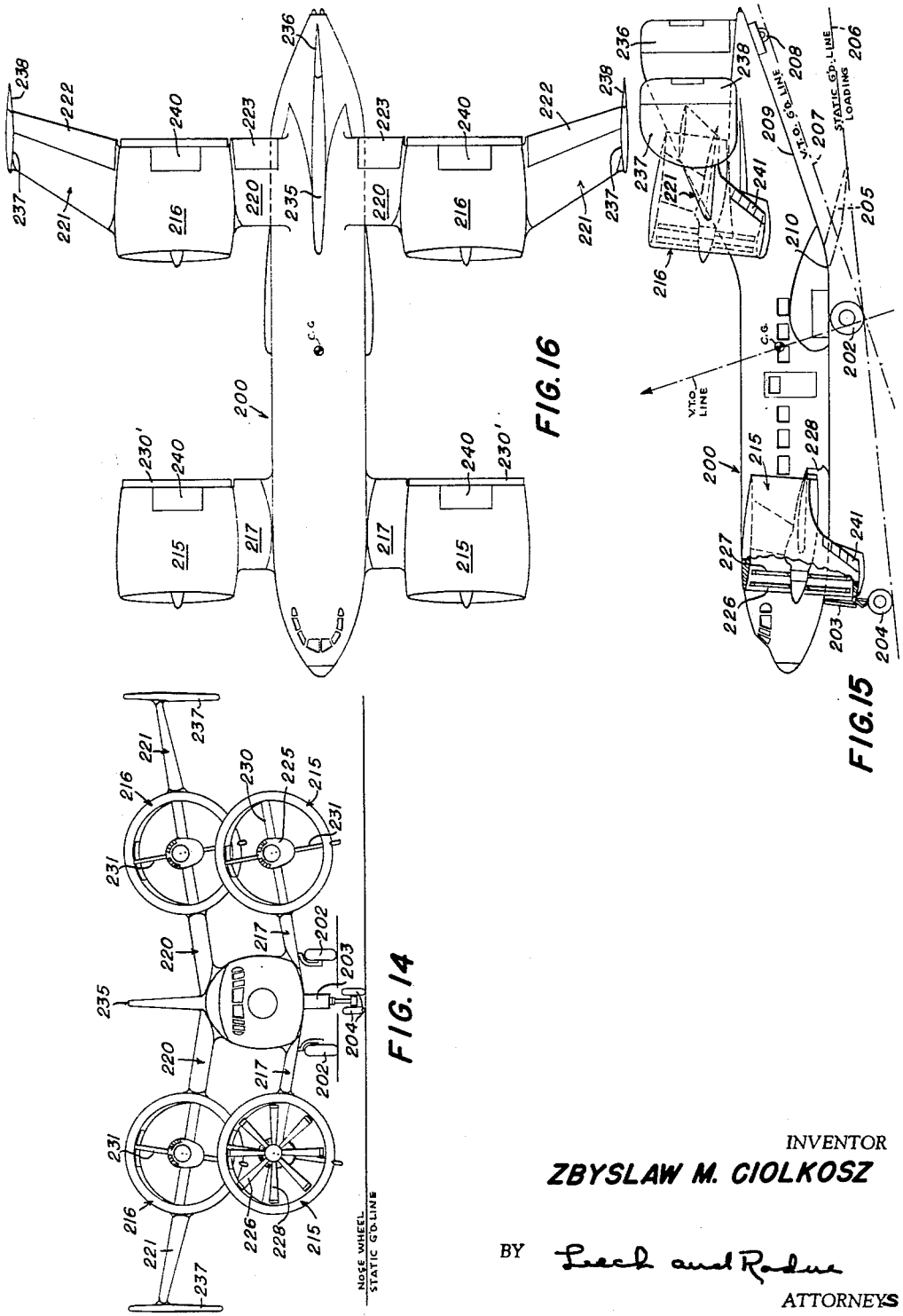
INVENTOR
*ZBYSLAW M. CIOLKOSZ*
BY *Leech and Radue*
ATTORNEYS

United States Patent Office 2,929,580
Patented Mar. 22, 1960

2,929,580

AIRCRAFT FOR VERTICAL OR SHORT TAKEOFF, AND INTEGRATED PROPULSION LIFTING AND PROPELLER SLIP STREAM DEFLECTING UNIT THEREFOR

Zbyslaw M. Ciolkosz, Glen Olden, Pa., assignor to Piasecki Aircraft Corporation, Philadelphia, Pa., a corporation of Pennsylvania Application June 18, 1956, Serial No. 591,926

28 Claims. (Cl. 244—12)

This invention relates to aircraft and more particularly to that variety capable of takeoff and landing without horizontal travel along the surface to attain or dissipate flying speed.

The invention further relates to aircraft and propulsion means therefor, the combination providing for a takeoff, landing and hovering attitude not substantially different from that of forward flight.

It is a general object of the present invention to provide an aircraft of the fixed wing variety having novel combination propulsion and lifting means for forward flight, and propeller slip stream deflecting means for providing a thrust vector for takeoff and landing.

More particularly it is an object of the invention to provide in an aircraft of the above type a takeoff and landing propeller thrust vector which closely approaches the vertical without rotating the aircraft and which passes close to the aerodynamic center of the wing, the center of gravity of the aircraft being located in proximity thereto.

An important object of the invention resides in the arrangement of an aircraft with a generally conventional fuselage and empennage and fitted on each side with at least one integrated propulsion and lifting unit, said units providing adequate span effect for lateral stability and control and improving the aircraft flight characteristics at low speeds.

Another important object of the invention comprises the construction and arrangement of the above units where the functions of propeller shroud, lifting surface and slip stream deflecting mechanism are integrated into one unit with the attendant advantages of lower weight, greater efficiency and shorter moment arm between deflected propeller thrust vector and wing aerodynamic center.

Still another important object of the invention comprises the development of the combination of ring wing and propeller shroud including: minimum chord at and near nadir to act primarily as propeller shroud to prevent slip stream contraction; whole leading edge in plane normal to propeller axis; chord above center determined by the equivalent of the angle of the whole wing trailing edge which is inclined in respect to the wing center line in order to provide adequate wing area; maximum discharge cross-section for the deflected propeller slip stream; housing for deflectors; and end plate effect for the latter.

A further object of the invention comprises the arrangement of flaps and vanes within the ring wing adjustable in position from neutral to maximum downward deflection for the propeller slip stream and positioned to provide a minimum moment arm for the deflected propeller thrust vector in relation to the aerodynamic center of the wing.

A still further object of the invention resides in the introduction of at least a central horizontal stator in each ring wing together with tandem arranged double flaps thereon adapted to be actuated to adjust the position of the deflected propeller slipstream vector and to act as landing flaps when the craft is set down in a conventional manner.

A further and important object of the invention resides in the incorporation of adjustable annular slot means at the leading edge of the propeller shroud to prevent flow separation in front of the propeller at zero and low forward speeds of the aircraft.

Other important objects and novel features are included among the following:

Use of stators or crossed stationary vanes in the ring wing to serve at least the following purposes:

a—To remove the whirl from the slipstream.
b—To support the propeller nacelle.
c—To house the propeller drive shaft.
d—To reinforce the ring wing.
e—To provide lateral surface and lift.
f—To support the tandem flaps and baffle them and the vanes when collapsed.
g—To house the vane and flap operating mechanisms.

Use of upper trailing edge flaps or ailerons on the ring wings to improve the efficiency of deflection of the slip stream and to provide means for lateral control of the aircraft.

Shifting of the resultant of the deflected propeller slip stream vector closer to the aerodynamic center by providing trailing edge flaps or other means on the lower portion of the ring wing to improve the exit conditions and induce higher mass flow.

Other and further objects and features of the invention will be more apparent to those skilled in the art upon a consideration of the following specification and accompanying drawings depicting several embodiments of the invention, with the understanding that such improvements on and combinations thereof may be made therein as fall within the scope of the appended claims without departing from the spirit of the invention.

In said drawings:

Fig. 2 is a top plan view thereof;

Fig. 3 is a left side elevation thereof, showing the craft in normal position on the ground, illustrating the ground line position for vertical takeoff and landing and showing the approximate takeoff thrust vector location;

Fig. 3A is an enlarged view of the tail of the craft better to illustrate the main and auxiliary exhaust jets and their deflecting devices.

Figure 5:
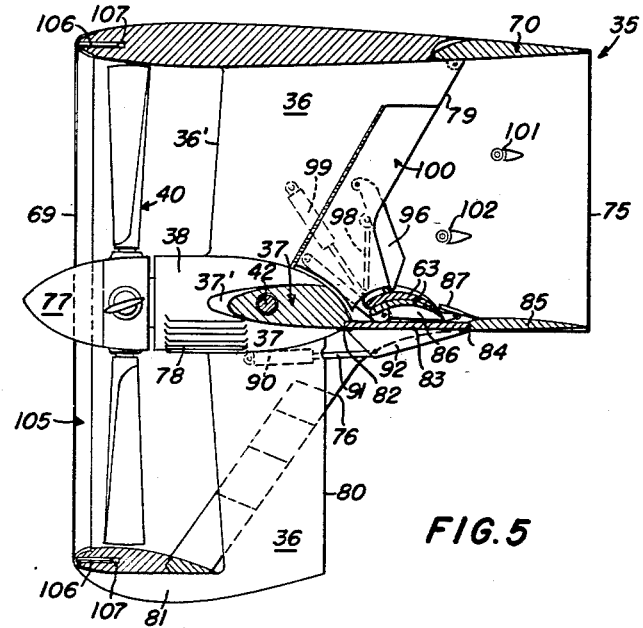
Fig. 5 is a vertical longitudinal central section through one of the units showing the deflecting vanes collapsed and housed in the flaps which are shown in inactive deflection position.
Figure 5A:
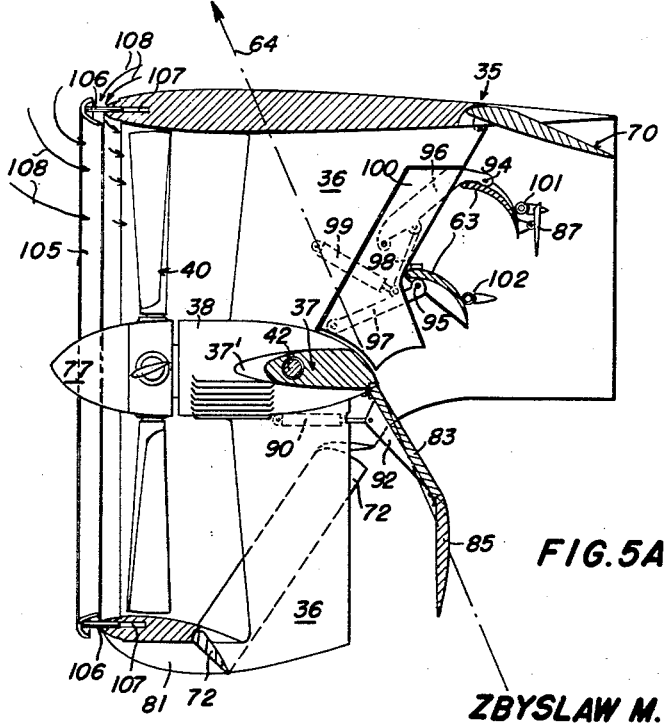
Figure 10:
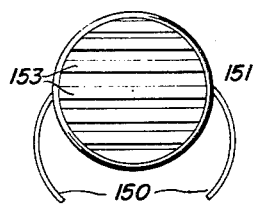
Figure 11:
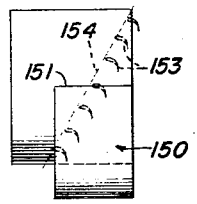
Figure 12:
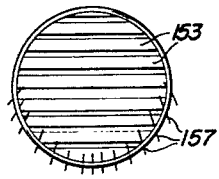
Figure 13:
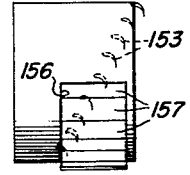

Fig. 5A is a view similar to Fig. 5 but showing the propeller slip stream deflecting vanes and flaps opened out for achieving a thrust vector deflection as shown, this figure along with Fig. 5 also illustrating a modification involving the use of means to provide an adjustable annular slot at the leading edge of the propeller shroud to prevent flow separation in front of the propeller at zero and low forward speeds;

Figs. 6 to 9, inclusive, show steps in the development of the integrated propulsion, lifting and propeller slip stream deflecting unit illustrating advantages gained by ducting the propeller and modifying the duct for use also as a wing;

Figs. 10 and 11 are respectively front and side elevations of a combined ring wing and propeller duct showing a modified form for achieving increased exit area and diffusion effect during deflection without truncation;

Figs. 12 and 13 are views similar to Figs. 10 and 11 but showing a further embodiment; and Figs. 14, 15 and 16 are respectively front elevation, side elevation and top plan view of a complete aircraft making use of four propulsion and sustaining units shown spaced from the fuselage by stub wings and having wing extensions beyond some of the units to incorporate control elements.

Aircraft capable of direct takeoff and landing, i.e., without a run, are at the present time largely limited to so-called "rotary wing types" which are valuable for many purposes because of their ability to hover and maneuver in any direction, but are seriously limited in their maximum speed because the tips of the advancing rotor blades soon reach the velocity of sound beyond which they are not capable of effective operation. Stall of the retreating blade at high forward speed further limits helicopter maximum speed. Fixed wing aircraft with low power plant weight possible through development of shaft turbines, low power loading and hence high performance can now take advantage of the higher power installed to provide the additional performance of vertical flight for vertical takeoff and landing characteristics, or in common parlance they "hang by their props," but to achieve this operation must be arranged to takeoff and land with their flight axis vertical, offering many difficulties in the proper seating of crew and passengers and in the stowage of cargo.

Other types of planes capable of substantially vertical takeoff and landing, hereinafter termed "VTOL" are those using various combinations of rotating and fixed wings and/or propellers. Most of the devices now available are only experimental and are recognized as in the transitional stage for they result in aircraft that are too greatly compromised for all purposes, thus losing their competitive advantages over the standard fixed wing airplanes.

The further variety of aircraft known by the symbols "STOL" cariously indicating slow or short takeoff and landing, have characteristics intermediate those described above.

The aircraft of the present invention is of the fixed wing type, capable of substantially vertical takeoff and landing, and at an attitude not greatly different from the flight attitude, by deflection of the slip stream of the propellers used thereon to provide thrust vectors nearly vertical and not substantially aft of the aerodynamic centers of the aircraft wings. The design of the present craft has been developed using a configuration consisting basically of a pair of unique integrated ring wings and propeller ducts which straddle a more or less conventional fuselage. These devices have a minimum forward speed of zero and a maximum speed above Mach 1. Zero and low speed flight are based on the deflection of ducted propeller slip streams by a system of flaps and vanes largely enclosed inside the ducts. For higher speed flight, the ducts function as "ring wings," combining a high efficiency propulsion unit with the inherent characteristics of ring wings, practically eliminating the danger of stalls or spins. The design is relatively simple, efficient, and safe, with wide application to many types of aircraft.

Figure 1:
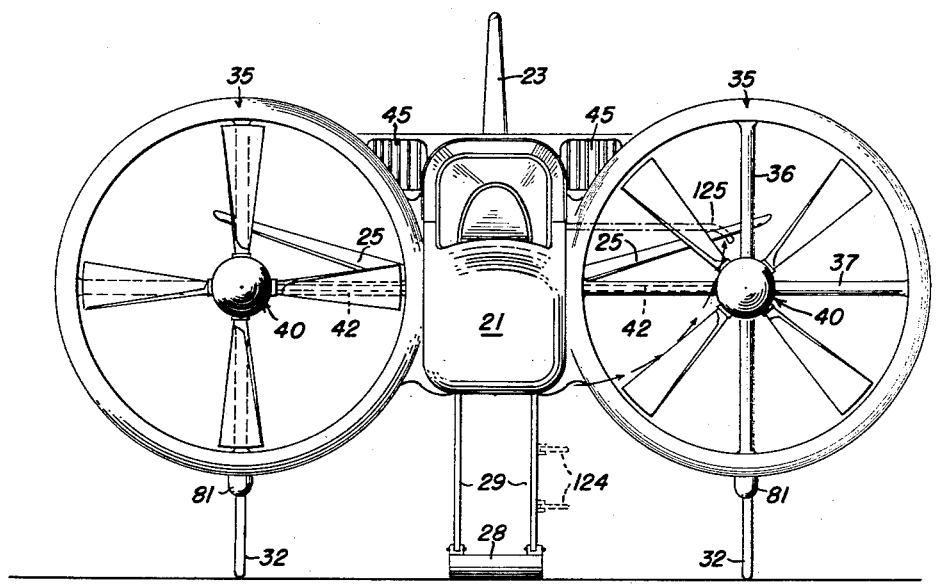
Fig. 1 is a front elevation of an aircraft in accordance with the present invention intended for vertical or short takeoff and showing two integrated propulsion, lifting and propeller slip stream deflecting units thereon.

For a better understanding of the invention, reference should now be made first to Figs. 1, 2 and 3, illustrating a simple form of aircraft incorporating the principal features of the present invention. In these figures there is depicted a craft having a more or less conventional elongated fuselage 20 having a forward cockpit area 21 and a relatively conventional empennage 22 which may include a vertical stabilizer 23 and rudder 24 plus horizontal stabilizer surfaces 25 provided with elevators 26.

The craft being of relatively small size is shown as supported on a simple retractable skid or ski 28 of sufficient overall length to support the craft in the position shown in Fig. 3. It is retractably positioned by means of struts 29 and 30 extended by suitable actuating and shock absorbing mechanism 31. Lateral balance is provided by secondary skids 32 engaging the ground ahead of the after end of the ski and each fitted with a shock absorber 33.

Obviously this type of equipment may be fully replaced with conventional wheels and shock absorbing equipment if necessary in order to take advantage of one of the craft's operating characteristics by takeoff from a normal runway, which permits operation with greater loads than when using the VTOL characteristic. The line on which the skids are shown resting is marked "Static Ground Line" and normally the craft when not in operation is positioned as shown in respect to this line.

The sustaining and propelling means as well as the propeller slip stream deflecting devices are incorporated in two identical but reverse units 35, one fixed to either side of the fuselage, as seen in Figs. 1 and 2, and appropriately filleted thereto in a manner clearly visible in the drawings. Each of these units is in the form of a "ring wing" combining a propeller shroud of generally cylindrical form and functioning also as the principal lift and sustaining means for the craft.

Arrangement of two or more integrated propulsion and lifting units on each side attached to a wing stub or stubs is also possible if increased span effect is of primary importance. Furthermore, addition of small wing tips to the integrated units may be useful for the same reason and also to decrease wing loading.

Each unit 35 has centrally positioned therein by means of a vertical stator 36 and a horizontal stator 37 a combined propeller shaft and gear box nacelle 38, mounting at its forward end and within the length of the wing a controllable pitch propeller generally designated 40, which is driven through the gear box and bevel gear set in the nacelle by a cross shaft 42 conveniently housed in the horizontal stator 37. The two cross shafts meet in a gear box 43 in the center of the fuselage and power is transmitted to this gear box from one or more engines preferably of the shaft turbine type housed beneath the hatches 44 as shown in Fig. 2. These receive their intake air through entrance grills 45 at the forward end of the upper filleting, and if two engines are used their exhausts are merged as seen at 46 in Fig. 2, the final exhaust pipe extending through the tail and having a nozzle 47.

As illustrated in Fig. 2 each of the two engines is fitted with a drive shaft 48, which enters the gear box 43 each being provided with an overrunning clutch, whereby either or both engines drive both propellers simultaneously, insuring against stoppage of either one should one engine fail.

Figure 4:
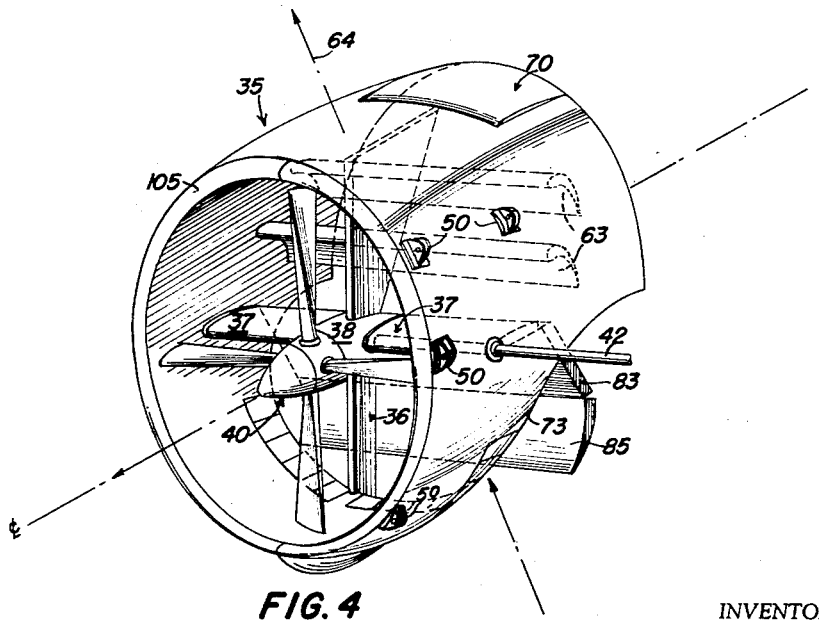
Fig. 4 is a perspective view of one of the integrated propulsion, lifting and propeller slip stream deflecting units separated from the aircraft.

Each combined wing and propulsion unit, best understood by the perspective view of Fig. 4, may be provided with a plurality of attachment fittings 50 which may readily be attached to mating units (not shown) secured to the fuselage, whereby a whole unit may be replaced with facility.

Figure 6:
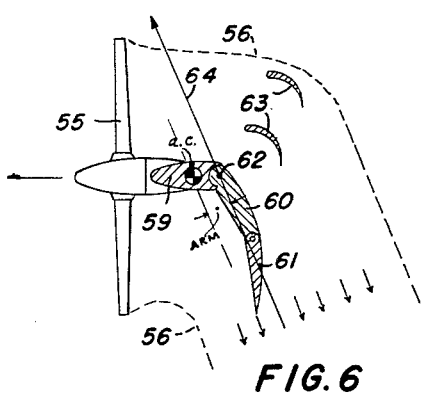

For a better understanding of the development of the combination propulsion and sustaining unit and propeller slip stream deflecting mechanism, reference should be had to Figs. 6 to 9, inclusive, which are largely diagrammatic. At 55 in Fig. 6 is shown a conventional aircraft propeller mounted in the open in front of a flat wing 59 of airfoil section, under which conditions for reasons well known the propeller slip stream air tube as it moves rearwardly is materially contracted, as illustrated at 56, which condition materially reduces its thrust.

Figure 7:
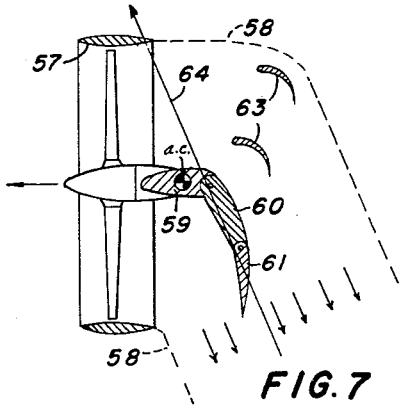

It has long been known that this undesirable operating condition can be improved by arranging a shroud ring 57 (Fig. 7) about the periphery of the propeller, and if this is properly designed and positioned in respect to the blades it provides a slip stream of unrestricted diameter as seen at 58, thereby materially increasing the static thrust. There is no gain in thrust, however, at high forward speeds since the propeller shroud, in common with every other surface subjected to relative movement of air, produces a substantial drag.

Where it is desired to use a deflected propeller slip stream to achieve a substantially vertical thrust for VTOL it has been proposed to provide the flat wing surface 59, just rearwardly of the unshrouded propeller, with tandem flaps 60 and 61 articulated thereto at 62 whereby they may be moved to the position illustrated from their normal horizontal position as parts of the flat wing for forward flight. These flaps may be assisted by two or more vanes 63 arranged above the wing in echelon so that substantially all of the propeller slip stream is deflected downwardly with a vector illustrated at 64, but with an area as in Fig. 6 considerably less than that of the propeller disc. These same deflecting flaps and vanes on the wing, as seen in Fig. 7, produce a result similar to Fig. 6, but because of the effect of the propeller shroud, the static thrust for VTOL will be considerably increased.

Since the propeller shroud 57 imparts at high speeds a certain amount of parasite drag and therefore decreases its otherwise beneficial effect on thrust, the applicant proposes to increase the shroud length and area and give it the dual function of shroud and sustaining wing for the aircraft. Hence, the parasite drag of the shroud will become the profile drag, which would be present with any wing design.

Figure 8:
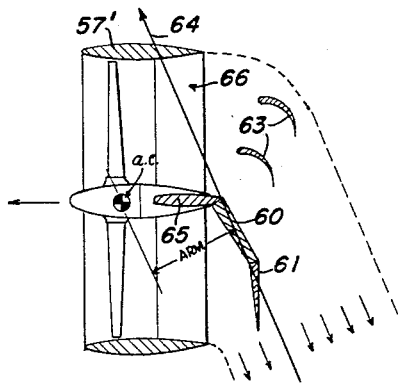

Fig. 8 shows the transition stage. Here the whole shroud chord 57' has been increased beyond that essential to provide most efficient propeller operation and prevent propeller slip stream contraction, to become an efficient lifting surface or ring wing. The chord is adjusted in respect to ring diameter to give the wing an overall lifting effect of the amount desired for any particular use.

If the center of gravity of the whole aircraft has been selected to be close to the aerodynamic center of the wing (shown by dot marked A.C.), for minimum trim disturbance between vertical and forward flights, the deflected propeller thrust vector should also pass close to the A.C. and consequently the moment of this vector in respect to the center of gravity should be small to require a minimum of compensation.

When vanes and flaps of the type shown in Figs. 6 and 7 are applied to ring wing structure of Fig. 8 and the former supported by the thin stator 65 having substantially no lift factor, the deflected thrust vector 64, while not substantially displaced in respect to the plane of the propeller disc, is displaced further aft from the aerodynamic center which has moved forwardly with the ring wing from those shown in Figs. 6 and 7 for flat wing design, and the moment arm is long, making for acute stability problems due to high pitching moment. It can be seen from Fig. 8 that the deflected propeller slip stream exit area in front of the double flap is too small, and the whole deflecting system consisting of flaps 60 and 61 and vanes 63 should be shifted farther back, making balance problems more difficult.

This construction, however, alleviates the parasite drag at high speeds since in one unit the drag is approximately the same as it would be in only a shrouded propeller or in a wing, whereas this unit provides the dual function of both.

Figure 9:
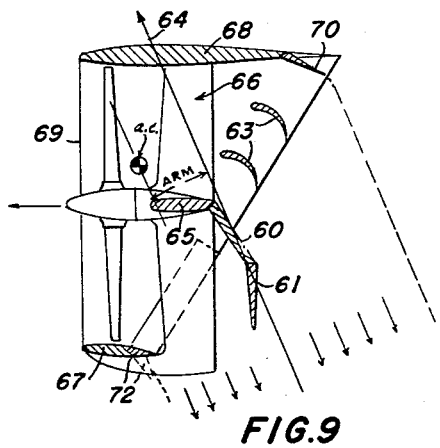

In Fig. 9 a final development is illustrated. In addition to the thin horizontal stator 65 there is provided a vertical stator 66 as also seen in Fig. 8. The chord at and near the nadir of the ring is only as long as necessary to make an effective propeller shroud, as seen at 67, while the chord of the wing at the top has been substantially increased to make up for area lost at the bottom, and this is seen at 68. While the front or leading edge 69 of the ring wing is in a plane normal to the axis of the propeller the trailing edge 70 has been forwardly and downwardly inclined to the order of 55 degrees to the ring axis to join the longer chord at 68 to the shorter one at 67. This truncated trailing edge, combined with the same location of stators, flaps and vanes as in Fig. 8 gives several added advantages. While the propeller slip stream is deflected at substantially the same distance behind the propeller disc as in Fig. 8, the moment arm between the lift vector 64 and the aerodynamic center, which has now risen above the axis of the propeller and moved aft, has been materially shortened as a comparison of Figs. 8 and 9 will illustrate.

By truncating the trailing edge of the ring wing the exit conditions for the deflected slip stream have been tremendously improved since enough exit area has been provided for the lower part of the ring. Moreover, the pitching moment of the wing is greatly reduced. Fig. 9 shows, in addition to the deflecting vanes 63 and the hinged dual extension flaps 60 and 61 of the horizontal stator, further means for assisting in the deflection and improving the exit area, including the flap-like element 70 in the upper portion of the wing, which can be seen better in Figs. 2 and 4. This not only assists in deflecting but may be used in lieu of a landing flap and as the equivalent of an aileron for lateral control of the plane. At the lower portion of the ring one or a plurality of small flaps 72 are provided, as better seen in Fig. 3. They, of course, contribute primarily to increasing the exit area but may also act as additional landing flaps. The angle of vector 64 can easily be made to fall within the range of 40 degrees to 65 degrees to the flight axis.

The truncation of the trailing edge of the ring wing may take many forms. It may be a straight diagonal cut with the trailing edge lying in a plane at an angle to the axis of the propeller, as seen in Fig. 9, it may have a concave curved configuration as seen at 73 in Figs. 3 and 4, or the whole upper half of the ring wing may be arranged with a trailing edge 75, as seen in Figs. 5 and 5A, which is parallel to the leading edge. This has the advantage of achieving uniform chord length for all of the structural elements for the whole upper half of the wing. The lower half may be arranged as shown on an incline 76 (Figs. 5 and 5A), not differing greatly from that in the lower half of Fig. 9, although the lower half could have also a straight trailing edge parallel to the leading edge but advanced from that of the upper half. These variations do not give substantial differences in the aerodynamic effect of the wing but may contribute in one way or another to the facility of designing and constructing it.

Figs. 5 and 5A show on an enlarged scale one embodiment of the propulsion and lifting unit, together with an illustration of one type of the mechanism for supporting and operating the vanes and flaps, although other solutions to the problem are possible. In these figures, as just recently stated, the ring wing 35 has its leading edge 69 in a plane normal to the axis of rotation of the propeller 40, which is of the adjustable pitch type provided with the usual spinner 77 and mounted with its shaft extending from the nacelle 38, shown fitted with gear box cooling fins 78 and supported in the wing 35 by the vertical stator 36, whose leading edge 36' is well behind the propeller and whose trailing edge has the inclined configuration 79 above the nacelle and the substantially vertical edge 80 below the same, where the fin extends considerably farther aft than the lower portion of the shroud and below the same as at 81 to provide for attachment thereto and housing thereof, outside of the propeller slip stream, of the lateral skid 32 seen in Figs. 1 and 3. The portion 81 supports the skid and its operating shock absorber 33 and also houses the mechanism (not shown) for operating the adjustable lower flaps 72.

The horizontal stator 37 has a swept back or straight leading edge 37' (Fig. 2) similar to that at 36' for the vertical one. It is cut off just to the rear of the nacelle and is fitted with a hinge 82 for attaching the first flap 83 thereto and this flap is fitted at its trailing edge with hinge 84 for the trailing flap 85. The whole hinge structure and flap arrangement is streamlined as much as possible and the lower surfaces formed as smooth as possible. The first flap is thin with its lower face aligned with the lower face of the stator and its upper face below that of the stator providing a space 86 for housing the vanes 63, one above the other, as viewed in Fig. 5. The panel 87 is hinged near the rear of the upper vane and spring actuated to fill up the space between the upper surface of the housed upper vane and the leading edge of the trailing flap 85. The flaps may be fitted with slats on their upper surfaces to resist turbulence there when deflected.

The flap 83 is adjusted about its hinge 82 at the rear edge of the horizontal stator by means of a hydraulic actuator 90 hinged to the nacelle 38 or stator part 30 and having a piston rod 91 extending through an opening in the lower stator and hinged to a rib 92 on the lower face of flap 83 which houses a mechanical connection for simultaneously actuating the trailing flap 85.

The supporting and operating mechanism for the two vanes is clearly seen in Figs. 5 and 5A. The upper one has a hinge 94 on a rib on its upper surface and the lower one a hinge 95 secured to a rib on its lower surface. The vanes are of the free floating type with the hinge points located at the zero moment line, which can be determined by a wind tunnel test. The two hinges are respectively connected to levers 96 and 97 pivoted as shown within the vertical fin 36. The levers are connected together by a mechanical link 98 and thus adapted to be moved simultaneously from the collapsed position of Fig. 5 to the extended position of Fig. 5A by the hydraulic actuator 99 having a piston rod pivoted to the lower lever. Most of the operating mechanism is housed between movable doors 100 forwardly hinged near the trailing edge of the upper portion of the stator 36. As the actuator 99 is manipulated to bring the vanes into position from their collapsed condition of Fig. 5, they float in the air stream about their hinges until their outer rear edges strike their respective stops 101 and 102 arranged one for each end of each vane, and these together with the limiting mechanism for the movement of the levers 96 and 97 determine their angle and their deflection action. The covering panel 87 automatically takes the position illustrated in Fig. 5A and may be of some value in aiding deflection.

The vanes are of such length and end configuration that their ends fit closely against the appropriate wall surfaces of the ring wing which support and steady these parts, and moreover act to provide the effect of end panels and hence enhance their effectiveness. The same is at least partially true of the flaps, especially positioned as shown in Fig. 5 although supplemental end plates may be attached to the flaps 83 and 85 to improve turning efficiency by elimination of side leakage.

As seen in Figs. 5 and 5A the lower ring edge flaps 72 may be in small units and suitably actuated (actuator not shown). In a like manner the flap 70 in the upper portion of the wing may be arranged for individual control and operation so that it may be used either as a deflector, as a landing flap or as an aileron for a lateral control.

In Figs. 5 and 5A there is illustrated respectively retracted and extended mechanism for providing an annular slot for the leading edge of the ring wing and the shrouded propeller to improve inlet conditions and prevent air flow separation, particularly at zero and low forward speeds. Such a slot is effected by means of an annular channel-like ring 105 having a contour, in section, similar to that portion of the leading edge of the ring wing from a position just outside of its most forward portion to a substantial distance inward thereof, and this ring, which by virtue of its transverse curved configuration, has great rigidity, is mounted, in one solution, on a plurality of piston rods 106 which are mounted in suitable cylinders 107 buried in the wing and provided with mechanism for projecting or retracting the rods whereby the ring may be housed against the leading edge where it is received in suitable recesses to provide smooth airflow surfaces. When, however, it is projected forward to or near the position illustrated in Fig. 5A there is provided an annular slot between this ring and the leading edge of the wing. The operation of this adjustable ring to provide the annular slot effect may best be described as follows:

The thin sharp nosed section of the wing and propeller shroud which is desirable for high speed conditions leads to early separation of the air flow at zero or low speeds when the mass flow through the shroud must be increased in order to obtain the high thrust essential for VTOL or STOL conditions. This phenomenon exists because in order to provide high mass flow, the induced air flow to the propeller comes from all directions, including over the external surfaces of the shroud, as seen by the arrows at 108. The air which follows the nose contour has to change its direction from forwardly to rearwardly while traveling at high speed over the leading edge of relatively small radius and is thus subject to high centrifugal force. Consequently, at certain conditions, the air stream will detach itself from the shroud leading edge and become a turbulent flow. To prevent this an annular slot is provided which will force the flow to adhere to the nose section and, by the application of a converging shape of the duct, between the slot and the shroud leading edge contour, accelerate the flow and provide a degree of boundary layer control by reason of the suction thus achieved. A mechanism for forming the annular slot may be produced in one part as shown or divided into any required number of segments if by this latter means better results can be achieved. With the separate arrangement some of the segments may be utilized also in fixed wing flight condition, thereby preventing the flow from separating at high angles of attack of the wing and reducing stalling. Thus the importance of the slot is obvious in the present application because it will permit the use of conventional airfoil sections for high speed conditions and will also provide improved air flow conditions for low or zero speed without changing the airfoil profile characteristics desired for high speed.

It is clear from the analysis of Fig. 9 that the thrust vector of each of the ring wing units is not at 90° of the axis of rotation of the propeller and it is aft of the aerodynamic center, A.C., and the center of gravity, if the latter is located close to the A.C., by a small moment arm, both of which contrive to provide a pitching moment for the craft, which must be overcome by suitable reaction means. Since the propulsion devices for the aircraft involve propeller driving turbine engines, these have a substantial propulsive exhaust jet effect which may be used for this purpose. As viewed in the enlarged broken away portion of the tail of the craft, as seen in Fig. 3A, the exhaust pipe 46 passes straight through to the tail nozzle 47 in normal operation for forward flight, but a second exhaust nozzle 115 is directed upwardly just behind the vertical rudder 22 and has a T-connection 116 with the exhaust pipe 46. Suitable deflecting means are provided which wholly clear the pipe 46 for direct ejection of the exhaust gases through 47 or which can selectively direct a chosen portion or all of them out through the vertical port 115 at least for counteracting the pitching moment of the lift or thrust vectors.

As shown in rudimentary form in Fig. 3, in solid lines positioned for vertical deflection of the exhaust gases and in dotted lines, both in this and in Fig. 3A, to permit these gases to flow rearwardly, is a series of curved vanes 118, connected together by and pivoted to parallel rods or links 119 and 120, at each end thereof, into an articulated unit having the links respectively pivoted at 121 and 122 suitably under control of mechanism 123 actuated by the pilot, whereby he may select the amount of counterthrust required to maintain the craft on the desired attitude and flight heading during takeoff and landing. The linkage arrangement shown maintains the curved vanes always oriented the same in respect to the axis of the exhaust pipe whatever their adjustment. Of course during straightforward flight all of the jet is directed rearwardly to assist in the propulsion of the craft forwardly.

Reverting now to the central supporting strut mechanism for the central skid, which it will be remembered can be replaced by conventional wheels, it will be seen that the forward strut member 29 is provided with steps 124 giving the pilot ready access to the entrance door 125 which is hinged at its upper edge 126 as seen in both Figs. 1 and 2. As viewed in the first of these figures in the dotted line open position, the door is seen to provide an effective screen between a person entering or leaving the cockpit and the air inlets 45 to the engine, thereby preventing any possibility of accident from this source should the doorway be used while the engine is running.

In Fig. 3 the rear ends of the skids 32 and of the whole skid 28 are in the same plane, i.e. ground static plane (shown as ground line). For vertical takeoff the aircraft is tilted rearwardly about the rear end of skid 28 until it hits the ground with its tail bumper 128. This tilting can readily be achieved by an appropriate blast through the vertical nozzle 115 when the deflecting vanes 118 are positioned as shown in full lines. To cushion the shock of the tail striking the ground when the craft is being adjusted to its VTOL takeoff position, a resilient bumper 128, seen in Fig. 3, is located appropriately beneath the empennage for the purpose.

In addition to adjusting the position of the exhaust deflector vanes 118 a further variation in the thrust to counteract the pitching moment of the lift vectors may be achieved by making the nozzle 115 adjustable in area under the control of the pilot. The orange peel dampers best seen in Fig. 3A provide a suitable type of control.

As viewed in Figs. 2, 3 and 3A the vertical thrust nozzle 115 and the horizontal thrust nozzle 47 each houses vanes 130 therein generally extending fore and aft and up and down and tiltable, for instance, about their pivots 131 by the control for the vertical rudder. The connection may be permanent for all regimes of flight. If the craft is fitted with wheels these vanes may also be used in conjunction with the rudder 22 during taxiing operation, thus eliminating the need for differentially operated propeller pitch change. The tilting vanes 130 may be used in VTOL, forward flight or on the ground to cause or correct yaw.

The mechanisms illustrated for deflecting the slip streams of the propellers obviously are subject to many adjustments in style and character and to different arrangements and relations of the parts. With slight changes in the design and/or mounting of the vanes designated 63 in Figs. 6 to 9, inclusive, they may become diffusers as well as deflectors, assisting in achieving a greater exit area for the deflected propeller slipstream, and by this increasing the static thrust of the propeller, which depends on the exit area to propeller disc area ratio. The trailing edge flaps 72 on these several figures when deflected will serve the same purpose, namely to increase the above-mentioned ratio. Under normal conditions the overall length of the wing chord at the bottom is desirably less than the propeller radius.

As another means of diffusing the slip stream the whole lower half of the air foil section of each propulsion unit may have its shape different from the more or less symmetrical section of the top half, i.e., it may have a substantial angle of diffusion with greater curvature on the inner face than on the outer, whereby the propeller slip stream is directed divergently in the lower half, which divergence carries through even though deflected downwardly by means of the flaps on the stator and those in the lower trailing edge of the airfoil. This arrangement gives a propeller slip stream area bigger than the propeller disc area and increases the static thrust of the propeller. The thrust of the shrouded propeller can be made even greater by the use of boundary layer control on the diffuser section. Similar control applied to the vanes and flaps can prevent early separation of the deflected air stream and will contribute to the efficiency of deflection.

A craft designed in accordance with the present invention may be of the medium speed type somewhat like that illustrated herein or with appropriate changes in fuselage and in the ring-shroud devices may be designed for supersonic flight. Supersonic flight using propellers is possible with appropriate design of the shroud-wing structure, whereby the air velocity through the duct at the propeller station may be decreased by expanding the inner duct shape to enable the propeller to operate in subsonic conditions. An additional advantage of the shrouded propellers which might be mentioned in passing is a substantial reduction in noise.

For operation with substantially vertical takeoff, the craft, positioned as shown in Fig. 3, is loaded, inspected and checked for operation, etc.; the engines are then started and a quick blast through the vertical nozzle 115 tilts the craft to the takeoff attitude when the bumper 128 touches the static ground line and the forward end of the skid 28 is lifted. The controls are set for maximum propeller slip stream deflection with the vanes 63 positioned as shown in Fig. 5A, the flaps 83 and 85 as shown in that figure, the exit flaps 72 down as shown and the aileron flaps 70 preferably partially depressed, but it must be remembered that the two aileron flaps may need independent manipulation during vertical takeoff to achieve lateral stability and control.

With the craft tilted to the position illustrated by the VTOL ground line in Fig. 3 the thrust along the vectors 64 is vertical to the ground line and the craft will rise substantially along the line of this vector when the propeller's collective pitch is changed to "coarse."

In transition from VTO into forward flight, first the forward speed will be increased from zero by the inclination of the whole craft toward the static ground line attitude. This will produce a certain forward speed due to the horizontal components of the thrust vectors, and when this is reached the two vanes 63 in each ring wing will be brought promptly into their retracted position, since in the form illustrated they have no effective intermediate positions. As the speed increases, resulting from no deflection of the upper half of the slip stream, the main flaps 83 and 85, the aileron flap and the exit flaps 72 will be slowly raised and the plane will achieve a forward velocity dependent only on propeller speed and attitude. For vertical landing the reverse of the above process is followed.

For landing on wings or for STOL, a trim servomechanism can change the ratio of mechanical linkage for deflection of the trailing flap 85, which is required to change the effectiveness of the wing.

In Figs. 10 to 13, inclusive, are shown largely diagrammatically two additional embodiments of the ring wing directed particularly to increasing the exit area. Thus in Figs. 10 and 11, showing forward and side elevations, the ring or shroud is of uniform length throughout its circumference, but all of the lower half aft of a chord constituting the minimum desirable for shrouding the propeller, is divided into two arcuate portions 150 which are conventionally hinged along or close to the horizontal center 151 of the wing and fitted with standard aileron actuator mechanism for opening them out to the position illustrated in Fig. 10 or closing them completely for forward flight. Along with these elements is a different deflection vane arrangement in which a plurality of vanes 153 is mounted along the hypothetical surface 154 and adjustable to determine the degree of propeller slip stream deflection.

In Figs. 12 and 13 the same arrangement of vanes 153 is shown and the ring wing is solid and of uniform chord throughout its circumference, except that in the lower rear half it is provided with an opening 156 which may be closed by a plurality of fore and aft slats 157 of shutter-like formation each pivoted on a fore and aft axis so that when closed they form a continuation of the configuration of the shroud-wing but when rotated each to the positions seen in Fig. 12 provide for maximum downward exit area for the slip stream under the action of the appropriately adjusted deflector vanes 153. Other means for achieving suitable exit area with permanent truncation of the ring wing may also be used.

In Figs. 14, 15 and 16 is illustrated a further embodiment of a complete aircraft, including a plurality of the combined lifting and propulsion units previously described. These figures illustrate the facility with which such craft can be designed to accommodate additional power where required or desired. In these figures no effort has been made to illustrate any of the minor details of the construction and engineering features, but attention has been directed solely to the basic embodiment and arrangements of the several components of the craft. It will be appreciated that many changes can be made in the arrangements shown without departing from the spirit of this embodiment of the invention directed primarily to a so-called transport aircraft. The craft includes any desired configuration of fuselage 200 having the customary "greenhouse" for the pilot and the necessary windows, entrance doors, loading ramps and the like, as clearly seen. The fuselage is unique in some respects, as best envisaged in Fig. 15. It is equipped with the more or less conventional, so-called tricycle landing gear, including the widely spaced rear or main landing wheels 202 and the rather elongated forward landing gear 203 accommodating a pair of smaller nose wheels 204. These are arranged in such a manner as to give the craft a feasible static loading line, facilitating the use of the rear loading ramp 205 and maintaining the side entrance door at a reasonable distance above the ground level. As seen in Fig. 15, the static ground line loading plane is indicated at 206 and inclines upwardly from the front to the rear considered in respect to the normal flight attitude of the craft in level flying.

Since the craft must be adapted for vertical takeoff and landing in somewhat the manner of the earlier disclosed form using but two lifting and propulsion units, the vertical takeoff ground line, which is normal to the V.T.O. vector is illustrated at 207, passes tangent to the rear wheels 202 and to the high level small tail wheels 208, arranged near the very rear tip of the fuselage, the under surface 209 of which slopes sharply upward from the position 210 only slightly aft of the rear wheels to the very tip. The craft can be rotated about the rear wheels, until the auxiliary wheels 208 touch the ground, by appropriate use of the deflected thrust of the forward lifting units, as will be appreciated when the description proceeds. The V.T.O. vector approaches closer to 90 degrees to the flight axis than in the first embodiment due among other things to engine axis tilt, and it may be said that this angle is not substantially less than 90 degrees.

The aircraft is fitted with four combined propulsion, lifting and power units, two numbered 215 and arranged forwardly, and two numbered 216 and situated well aft along the fuselage. The forward units are spaced from the fuselage by means of wing stubs 217 improving the span effect, and because of their camber raising the units 215 well above the ground level to permit the use of large diameter propellers. The stub wings 217 are substantially tangent to the lower surface of the fuselage, while the stub wings 220 supporting the rear units 216 from the fuselage extend substantially from its top surface, as clearly seen in Figs. 14 and 16. The rear assemblage of wing stubs 220 and swept back wing extensions 221 projecting laterally beyond the propulsion units 216 constitute an aft control surface assembly providing mountings for the ailerons 222 on the wing extensions and the flaps or ailerons 223 on the wing stubs. These obviously may be arranged to act also as landing flaps.

The combined propulsion, sustaining and power units 215 and 216 are not substantially different from those described in great detail in connection with the earlier embodiment of the invention except that each supports and carries in place of the gear box nacelle a complete turboshaft engine 225 illustrated with air scoops and the like in elementary form in the several figures. Each such a power unit is fitted with a pair of four bladed contrarotating propellers 226 and 227, and each of the engines exhaust directly to the rear of its ring wing at 228. The engine units are supported as in the other embodiments by stators 230 extending in the plane of the corresponding wing stubs and stators 231 normal thereto. The stators corresponding to the planes of the wing sections are seen in Fig. 16 to have flaps which normally extend rearwardly of the ring wings to complete the continuity fo the wing stubs. These extensions are numbered 230'.

As seen in Fig. 15 units 215 are considerably more forwardly in respect to the fuselage length than where a single pair is used alone in an aircraft. These so-called main units are set at an angle of the order of 3½ degrees to the axis of the fuselage and as seen in Fig. 14 the propeller slip streams pass substantially beneath the ring wings 216 in the tail assembly, and these are well elevated as best seen in Figs. 14 and 15 and preferably have their axes at an angle of the order of 6½ degrees to the axis of the fuselage. The substantial distance between the two sets of ring wings, their echelon arrangement and angularity all contribute to the prevention of interference between the slip streams of one set of propellers and those of the other.

Reverting to the tail portion of the craft, it will be seen that there is a central vertical fin 235 provided with a vertical rudder 236. For the purpose of resisting lateral deviation of the aircraft each of the wing extensions 221 is supplied with a large end plate 237, and each of these is fitted with a vertical rudder 238. These also act in the usual manner of an end plate to prevent air flow from the under to the upper surface of the wing.

Since the aircraft is so designed that the center of gravity, as shown by the dot in Fig. 16, is intersected by the vector representing the sum of the vertical lift thrusts of the four propulsion units, no mechanism such as the tail exhaust nozzle is necessary in this construction and each of the engines exhausts directly as indicated previously.

Because of the location of the engines in the ring wings some minor changes may be required in the arrangement of the flaps and vanes for achieving the necessary thrust for VTOL. From the drawings can be seen the aileron type flaps 240 on the upper surfaces of the ring wings and the multi-flaps 241 on their lower surfaces to increase the exit area for the deflected propeller slip streams.

In operation the craft is set for takeoff by resting on the main wheels 202 and the supplemental tail skid wheel 208, achieving this position by suitable downwardly directed blasts from the forward power units only. Thereafter with the VTOL line then substantially vertical, the four engines are operated in unison, with their propeller slip streams properly deflected downwardly and the craft rises substantially vertically as in the case of the previously described embodiment. Thereafter the transition to forward flight is accomplished as already described.

I claim:

1. A propulsion and sustaining unit for aircraft comprising in combination, a ring for fixed attachment to a fuselage with its axis substantially parallel to the flight axis thereof, a nacelle, a fixed horizontal wing stator and a fixed vertical stator element in said ring supporting said nacelle at said ring axis, a propeller forward of, supported by and driven from, a power shaft in said nacelle and having blades fully housed in said ring, the nadir of said ring having the minimum chord necessary to prevent contraction of the propeller slip stream from propeller diameter, the ring portion above the horizontal transverse axis having a chord sufficiently greater to cause the ring to act as a wing whose aerodynamic center is above the said axis but not substantially aft of the center plane of the propeller, said horizontal stator being of substantially less chord than that of the upper portion of the wing, deflector means connected to said stator and movable from a neutral position to one capable of deflecting the lower half of the propeller slip stream not less than 45° downwardly, and means associated with said stator for actuating said deflector means.

2. The unit as defined in claim 1 in which said deflector means comprise flaps arranged in tandem and articulated to each other and to the trailing edge of said horizontal stator.

3. The unit as defined in claim 1 in which the said actuating means are housed in said vertical stator.

4. The unit as defined in claim 1 in which curved vanes are provided adapted to be housed behind said stator and means to position said vanes in echelon above and behind the trailing edge of said stator to deflect the upper half of the propeller slip stream downwardly behind the deflected lower half.

5. The unit as defined in claim 2 in which the upper portion of said wing is fitted with an aileron flap set in its trailing edge and means to adjust said flap to assist said deflectors or for flight control.

6. The unit as defined in claim 2 in which the trailing edge section of the lower portion of said ring is formed into flaps hinged to the lower portion thereof and means to move said flaps outwardly to increase the exit area of said ring for the deflected lower half of the propeller slip stream.

7. A propulsion and sustaining unit for aircraft of the vertical take-off or landing type comprising in combination a ring wing having a leading edge normal to the ring axis and a trailing edge effectively truncated forwardly and downwardly at an angle of the order of 55° to said axis, a propeller, means mounting and supporting said propeller from said ring wing for rotation on said axis closely behind the leading edge, said truncation reducing the nadir of the wing to a chord of just sufficient length to shroud the propeller to prevent slip stream contraction beyond the ring and thereby providing an exit area greater than that of the propeller disc, means articulated to and housed within the ring adjustable from neutral positions for forward flight to active positions to deflect the propeller slip stream downwardly through an angle at not less than 40° and out through said exit area and means supported by said ring to adjust said deflector means between said positions.

8. The unit as defined in claim 7 in which the deflecting means include a horizontal stator diametrically traversing said ring, tandem flap means hinged to the trailing edge of said stator within the ring and substantially coincident with the lower edge thereof, means to adjust said flap means downwardly to a position to deflect the lower half of the propeller slip stream through an angle of not less than 40° from the axis of said ring, curved deflector vanes normally housed substantially along a diameter of said wing, above said flap means and behind the trailing edge of said stator, and means supporting said vanes from the ring and movable to adjust said vanes to individual positions in echelon above and to the rear of said trailing edge of said stator to deflect the upper half of the propeller slip stream downwardly through said exit.

9. The unit as defined in claim 8 in which said vane adjusting means provides individual settings to diffuse the propeller slip stream and provide greater thrust for vertical take-off or landing.

10. The unit as defined in claim 8 in which said vanes in their deflecting setting each have their ends fitting closely against the walls of said ring for support and end plate effect.

11. The unit as defined in claim 8 in which a diametrically disposed vertical stator houses the operating mechanism for said tandem flaps and deflecting vanes.

12. The unit as defined in claim 7 in which the trailing edge of the lower portion of the ring is composed of a series of flaps, and means hinging the forward edges of the flaps to said ring for deflection outwardly to increase the said exit area and diffuse the propeller slip stream when deflected.

13. An aircraft adapted for forward flight and vertical take-off or landing in attitudes of the same order including in combination, an elongated fuselage having an empennage with controls, a ring wing unit of the type defined in claim 9 fixedly secured to each side of said fuselage with its thrust axis substantially parallel to the flight axis of the craft, a shaft-turbine engine in said fuselage, drive means connecting said engine to both propellers, a substantially axially directed exhaust nozzle in said tail, an upwardly directed exhaust nozzle in said tail, an exhaust pipe connecting said engine to both said nozzles, and adjustable deflector means positioned to determine the ratio of exhaust products emerging from said nozzles.

14. The aircraft as defined in claim 13 in which at least the area of the upwardly directed nozzle is adjustable to effect changes in counter-thrust to the deflected propeller slip stream thrust vectors to compensate for the positioning of these vectors aft in respect to the center of gravity of the aircraft.

15. The aircraft as defined in claim 13 in which at least one of said nozzles is fitted with vanes, and means to adjust said vanes to deflect the gases flowing over them selectively to either side or straight out from the nozzle.

16. An aircraft adapted for normal forward flight and vertical take-off or landing, having in combination, an elongated fuselage unit fitted with empennage and controls, a shaft-turbine engine and gear box in said fuselage, a combined ring wing and propulsion unit as defined in claim 1 secured to each side of said fuselage with the aerodynamic centers thereof in substantial transverse alignment with the center of gravity of the fuselage unit, a shaft connection from the engine gear box through each horizontal stator to said nacelles, gearing in each nacelle for driving its propeller from the shaft connection, the thrust vectors of the deflected propeller slip streams of said combined units being aft of their aerodynamic centers giving the craft a nose down pitching moment on vertical take-off or landing, and means effective in the empennage area to counteract said pitching moment.

17. A propulsion and sustaining unit for aircraft comprising in combination, a barrel-like ring wing with walls of longitudinal airfoil section varying in length from a minimum at the bottom to a maximum at the top, a propeller, means supporting said propeller from the wing and mounting it for rotation about the axis of said ring closely behind the leading edge thereof which is parallel to the plane of the propeller disc and with its blade tips just clearing the ring walls, said minimum being not greater than blade radius to shroud the propeller for preventing slip stream contraction, and said maximum being such that the effective truncation of the barrel is at an angle of the order of 55° to the ring wing axis, and means carried by and largely within the ring wing adjustable to deflect substantially the whole propeller slip stream downward through said truncation at an angle of the order of 65° to the axis of the ring wing.

18. A propulsion and sustaining unit for aircraft comprising in combination, an open-ended barrel-like ring wing with walls of longitudinal airfoil section starting from a leading edge normal to the barrel axis and ending in a trailing edge similarly oriented, a propeller, means supporting said propeller from said wing for rotation on the axis of the ring wing and with its plane of rotation slightly behind the leading edge thereof, propeller slip stream deflector means in said barrel disposed generally along a plane which is inclined from near the upper trailing edge to a position slightly aft of the propeller at the ring wing bottom, means to adjust said deflector means from substantially neutral positions for forward flight to positions inclined to deflect the slip stream downwardly and rearwardly at an angle of at least 45° to said axis and means forming normally closed barrel walls below the horizontal center line and aft of the propeller, said means being adjustable to open position to provide for direct exit of the deflected propeller slip stream.

19. The unit of claim 18 in which said last mentioned means comprise barrel wall portions meeting at the nadir, hinges securing the upper edges of said portions to the remainder of the ring wing on substantially horizontal lines and means to adjust said sections to positions where the normally meeting lower longitudinal edges of said portions are spaced apart to the order of ring wing diameter.

20. The unit of claim 18 in which the lower half of the ring wing aft of the propeller is formed of slats whose edges are normally contiguous, means hinging said slats on fore and aft axes and means to rotate said slats about said axes to open the lower rear portion of the ring wing for free downward exit of the deflected propeller slip stream.

21. An aircraft adapted for forward flight and vertical take-off or landing in attitudes of the same order including in combination, an elongated fuselage having an empennage with controls, a ring wing unit of the type defined in claim 9 and a flat stub wing fixedly secured to each side of said fuselage, one connecting the other thereto to increase the span, a shaft-turbine engine in said fuselage, drive means connecting said engine to both propellers, the thrust vectors of the deflected propeller slip streams of said combined units being aft of their aerodynamic centers giving the craft a forward pitching moment on vertical take-off or landing and means effective in the empennage area to counteract said pitching moment.

22. An aircraft adapted for forward flight and vertical take-off or landing in attitudes of substantially the same order, having in combination, an elongated fuselage, wing stubs extending from the lower area of the forward portion of said fuselage, a ring wing propulsion and sustaining unit carried by each wing stub, a tail assembly comprising wing stubs extending from the upper area of the rear portion of the fuselage, a ring wing propulsion and sustaining unit carried by each of said last mentioned wing stubs and positioned thereby to avoid the propeller slip streams from the forward units, a wing extension beyond each of said last mentioned units in alignment with its stub, control surfaces on said last mentioned stubs and on said extensions, and means associated with each of said units to deflect the propeller slip stream thereof in a downward direction, the center of gravity of said aircraft being substantially on the vector resultant of the down thrust of said units.

23. The aircraft of claim 22, in which each of said ring wing propulsion and sustaining units is self powered by a shaft turbine, and crossed stators in each unit supporting the turbine at the center thereof.

24. The aircraft of claim 22 in which the fuselage is principally supported on the ground by rear wheels just slightly aft of a vertical through the center of gravity of the craft, the fuselage aft of said wheels having its lower surface rising rapidly toward the rear end thereof and an auxiliary wheel beneath said surface to cooperate with the main wheels to support the craft in a vertical take-off position with the said vector substantially vertical.

25. An aircraft for forward flight and vertical take-off or landing in attitudes of substantially the same order, in combination, an elongated fuselage having tandem wings arranged at substantially different elevations in respect to the flight axis, each wing including at least two ring like propulsion and sustaining units, a propeller in each unit, means to deflect the slip stream of each propeller downwardly to provide a vertical take-off or landing combined vector passing through the center of gravity of the aircraft and between the wings and inclined not substantially less than 90° to the flight axis of the aircraft, and said wings positioning said units in echelon to eliminate interunit propeller slip stream interference in forward flight.

26. The unit as defined in claim 1 in which the ring has a thin leading edge sharp enough for speed approaching sonic and arranged normal to its axis and means carried by said ring and movable in respect to said edge to provide a slot between it and said edge to prevent turbulence about said edge at zero and low forward speeds of the unit.

27. The unit of claim 7 in which the leading edge of said ring wing is relatively sharp and thin enough for use at speeds approaching sonic, a thin cover for said edge conforming in shape thereto, means to move said cover forwardly from said edge to guide air from outside the ring over said edge under the action of said propeller without substantial turbulence in zero and slow speed flight.

28. The unit as defined in claim 7 in which the upper rear portion of the ring wing is provided with a cutout to a depth of the order of 25% of its chord, an aileron flap sized to fit said cutout and means hinging and mounting said flap from said ring wing for tilting about a transverse axis for improving deflection and for stability control in flight.

References Cited in the file of this patent

UNITED STATES PATENTS

| | | |
|---|---|---|
| 1,800,794 | Hartman | Apr. 14, 1931 |
| 1,824,250 | Wells | Sept. 22, 1931 |
| 2,118,052 | Odor | May 24, 1938 |
| 2,468,559 | Kangas | Apr. 26, 1949 |
| 2,610,005 | Price | Sept. 9, 1952 |
| 2,780,424 | Price | Feb. 5, 1957 |

FOREIGN PATENTS

| | | |
|---|---|---|
| 558,943 | France | June 5, 1923 |
| 727,432 | France | Mar. 29, 1932 |
| 989,177 | France | May 23, 1951 |
| 1,050,948 | France | Sept. 9, 1953 |